(12) United States Patent
Maus et al.

(10) Patent No.: US 7,393,389 B2
(45) Date of Patent: Jul. 1, 2008

(54) APPARATUS FOR SEPERATION OR SYNTHESIS OF PROCESS SUBSTANCES

(75) Inventors: Harald Maus, Sindelfingen (DE);
Clemens Merten, Stuttgart (DE); Maria Acosta, Stuttgart (DE)

(73) Assignee: University of Stuttgart, Stuttgart (DE)

( * ) Notice: Subject to any disclaimer, the term of this patent is extended or adjusted under 35 U.S.C. 154(b) by 335 days.

(21) Appl. No.: 11/009,542

(22) Filed: Dec. 13, 2004

(65) Prior Publication Data

US 2005/0147858 A1 Jul. 7, 2005

(30) Foreign Application Priority Data

Jun. 14, 2002 (DE) ................................ 102 26 609

(51) Int. Cl.
*B01D 53/22* (2006.01)
*H01M 8/10* (2006.01)
*H01M 8/06* (2006.01)

(52) U.S. Cl. .............................. 96/7; 96/4; 96/9; 96/11; 95/54; 95/55; 429/26; 429/30; 429/32; 429/34; 429/36; 429/39

(58) Field of Classification Search ........................ 96/4, 96/7, 11, 9; 95/45, 53, 54, 55; 55/524, DIG. 5; 429/12, 26, 30, 32, 34, 36, 38, 39
See application file for complete search history.

(56) References Cited

U.S. PATENT DOCUMENTS

| 5,484,666 | A | | 1/1996 | Gibb et al. | |
|---|---|---|---|---|---|
| 5,543,240 | A | | 8/1996 | Lee et al. | |
| 5,997,594 | A | * | 12/1999 | Edlund et al. | ..................... 96/7 |
| 6,110,612 | A | * | 8/2000 | Walsh | .......... 429/34 |
| 6,319,306 | B1 | * | 11/2001 | Edlund et al. | ..................... 96/7 |
| 6,444,346 | B1 | * | 9/2002 | Ohara et al. | .................. 429/36 |
| 6,566,001 | B2 | * | 5/2003 | Yosida et al. | ................. 429/30 |
| 6,660,069 | B2 | * | 12/2003 | Sato et al. | ......................... 96/4 |
| 6,815,115 | B2 | * | 11/2004 | Sugita et al. | .................. 429/32 |
| 6,858,338 | B2 | * | 2/2005 | Sugiura et al. | ................ 429/32 |

* cited by examiner

*Primary Examiner*—Jason M. Greene
(74) *Attorney, Agent, or Firm*—Fish & Richardson P.C.

(57) ABSTRACT

An apparatus for separation or synthesis of process substances is configured with at least two cell stacks, within each of which there is arranged at least one large-area layer for the separation or synthesis and passages are formed for feeding and discharging at least one process substance to or from the at least one layer. To ensure that the ratio of active surface area to total area of the layer is as high as possible yet on the other hand that uniform distribution of at least one process substance over the layer are ensured, at least two passages for a process substance are formed within at least a first cell stack, of which a first passage is used to pass the process substance through the first cell stack to a second cell stack and of which the second passage is used to feed or discharge the process substance to or from the at least one layer in the first cell stack.

13 Claims, 4 Drawing Sheets

APPARATUS FOR SEPERATION OR SYNTHESIS OF PROCESS SUBSTANCES

CROSS-REFERENCE TO RELATED APPLICATIONS

This is a continuation of international application PCT/EP03/06126, filed Jun. 11, 2003, designating the U.S. and claiming priority under 35 U.S.C. §119 from German application DE 102 26 609.3, filed Jun. 14, 2002. The entire contents of these priority applications are incorporated herein by reference.

TECHNICAL FIELD

The invention relates to an apparatus for separation or synthesis of process substances, in particular with optimization of separating-layer consumption and flow routing, Furthermore, the invention relates to a fuel cell, in particular a polymer electrolyte membrane (PEM) fuel cell, having an apparatus of this type for separation or synthesis of process substances.

BACKGROUND

Apparatuses of the above type are used for substance separation or substance synthesis processes in which, for example, two process spaces are separated from one another by a partially permeable large-area layer, for example in the form of a membrane. For example, in the case of synthesis processes of a PEM fuel cell, the process spaces are separated from one another by selectively permeable layers, in particular membranes. The layers or membranes are in this case predominantly permeable to ions which are used for charge transfer.

In a cell stack of an apparatus of this type, passages for routing process substances penetrate through the selectively permeable layers in the interior of the cell stack. The layers are sealed at their outer edge and at their edges adjoining the passages.

A certain minimum surface area of membrane or layers has to be made available for the desired chemical or electrochemical separation or synthesis process. The consumption of surface area and therefore of layer material is increased by the fact that the passages and their seals are routed through the layers. However, the material required to produce the layer, in particular in the case of PEM fuel cells, is relatively expensive. Therefore, it is fundamentally the aim for only small amounts of such material to be installed in the apparatus.

Apparatuses with high process flows require relatively large passage cross sections within the layers, and consequently the desired cost objectives cannot be achieved, on account of the large amount of material cut from the layers.

In addition to efficient utilization of the material of the layers, it is also a requirement for the individual process substance to be distributed uniformly over the area of the layers in the cell stack. Furthermore, the overall pressure loss in the passages for feeding and discharging the individual process substance should be as low as possible.

U.S. Pat. No. 5,484,666 A has disclosed a cell stack of an electrochemical cell in which feed and discharge passages are routed through a multiplicity of membranes. This keeps the total volume of the cell stack relatively small, but the amount of material cut from the membranes for the passages is large. Furthermore, tie rods for connecting and clamping the cell stack are formed through the passages in the cell stack. The tie rods are supported on front and end plates of the cell stack, in which connections for the passages are also formed.

U.S. Pat. No. 5,543,240 A has disclosed an overall fuel cell stack in which a process substance is routed to individual cell stacks through external supply passages. The external supply requires additional components, and in particular valves for connection to the cell stacks, and makes it more difficult to achieve a space-saving and inexpensive design of the overall fuel cell stack.

SUMMARY

The invention is based on the object of providing an apparatus for separation or synthesis of process substances in which on the one hand the active surface area of the layer for the separation or synthesis is as large as possible in relation to the total area of the layer, and on the other hand uniform distribution of at least one process substance over the at least one layer is ensured.

According to the invention, this object is achieved by the apparatus for separation or synthesis as claimed in claim 1 and the fuel cell as claimed in claim 13. Advantageous refinements of the invention are described in the subclaims.

In the apparatus according to the invention, the passages for feeding and discharging process substances are fundamentally arranged inside the cell stacks. This creates a compact design of the apparatus which can easily be configured in modular form.

At the same time, according to the invention there is not just a single passage provided for supplying an individual process substance, for example, but rather at least two passages are formed in the cell stack. At least a first passage of these at least two passages, preferably what is known as an outer passage, is routed through the first cell stack, thereby allowing a second cell stack to be supplied with the process substance without the corresponding volumetric flow of the process substance having to be routed through the layers or membranes of the first cell stack. At least one second passage, preferably what is referred to as an inner passage, is used specifically to supply the layers in the first cell stack. Since this second passage only has to supply the layers of this first cell stack but is not used to carry further volumetric flows, the second passage can be designed with a relatively small cross section. On account of this small cross section, the loss of area for the second passage in the overall surface area of the cell stacks is low. The configuration with at least two passages overall leads to a more compact design of the cell stack, in particular of the overall stack, and to a relatively low flow resistance in all the passages for supplying or discharging a process substance. Furthermore, the overall pressure loss at the passages is reduced.

In an advantageous refinement of the invention, the second passage passes through the at least one layer, whereas the first passage is arranged outside the at least one layer. This arranging of the first passage outside the region of the layers and at the same time within the cell stack or overall stack allows the modular structure of the cell stack or cell structure to be used for the first passage and at the same time allows the consumption of surface area of the layers for all the passages to be reduced considerably. The modular structure of the cell stack enables the first passage to be formed by an opening that is simple to form in cells in plate or disc form which have been placed against one another to form a stack. A cell stack of this type is in any case formed in apparatuses of the generic type, and consequently the formation of the opening for the first passage merely needs to be carried out as an additional production step.

It is particularly advantageous for the first passage to have a larger cross section than the second passage. In this way, a relatively large volumetric flow can be made to bypass the first cell stack through the first passage, without the surface area of the layers in the first cell stack being reduced for this bypass. Furthermore, the bypass arrangement does not require any additional components. On account of the first passage having a relatively large cross section, the pressure loss in the passages for supplying or discharging a process substance can be kept at a low level.

To realize a controlled supply and discharge of a process substance in a cell stack in a simple way, it is possible, in the apparatus according to the invention, for at least one transfer passage for connecting at least one first passage to at least one second passage to be formed in a simple way within the first cell stack.

The supply and discharge can additionally be advantageously varied by means for adjusting or limiting a flow through the transfer passage as desired being provided within the transfer passage.

Said transfer passage advantageously does not need to be designed with additional components on the outside of the cell stack, but rather can advantageously be integrated in a transfer plate between the first cell stack and the second cell stack.

Furthermore, the transfer plate which is formed in this manner may advantageously at the same time also perform other functions required for operation of the apparatus. By way of example, temperature control can be integrated, so that the transfer plate is designed in particular as a cooling plate. A transfer and cooling plate of this type as a single unit performs a plurality of functions required for operation of the apparatus, it being possible for the transfer plate to be fitted into the apparatus by simply inserting it between two cell stacks.

Furthermore, the apparatus according to the invention enables a tie rod to be arranged in the first passage and/or the second passage. A tie rod of this type is used to clamp the cell stacks or the overall stack and the transfer plates arranged between them. The at least one tie rod is integrated in the overall stack and at the same time ensures an advantageous flow of forces.

To realize the flow according to the invention through the first and second passages in an overall stack comprising a plurality of cell stacks in an inexpensive and compact way, it is possible for two cell stacks to be separated by a separating or barrier plate through which the first passage passes. In this way, the barrier plate restricts the flow through the second passage to the portion of the first cell stack, whereas it transfers a flow in the first passage of the first cell stack into the second cell stack.

The barrier plate may advantageously be combined with further elements required for an overall stack. For example, the barrier plate may simultaneously be designed as a temperature-control plate or as a seal.

Finally, it is advantageously possible for at least one temperature-control passage to pass through at least one cell stack in the cell stack according to the invention, outside the region of the layers, without the active surface area of the layers being reduced further as a result.

The configuration according to the invention of an apparatus for separation or synthesis of process substances makes the active surface area of the layers relatively large, so that the overall consumption of layer material is optimized. The costs of the layers are correspondingly lower, since small passage cross sections within the layers mean that less material has to be cut out. On average, the apparatus according to the invention allows around half of the layer surface area to be saved compared to conventional concepts with the same overall passage cross section.

Furthermore, the invention allows flexible routing of the flow of a process substance within an overall stack or cell stack. The flows in the passages can be selected freely by using suitable barrier or intermediate plates in the overall stack or cell stack in portions for the feed and discharge of each process substance. It is easy for connecting or locking devices to be formed in the barrier plates. In particular, it is possible to achieve a preliminary distribution of one or more process substances. This allows the cells within a cell stack to be connected, for example, in a U configuration (i.e. the inlet and outlet are located on the same side of the cell stack), whereas the cells of a second cell stack can be connected in a Z configuration (i.e. the inlet and outlet are located on opposite sides of the cell stack).

The cell stack or overall stack may preferably be connected to the peripheral equipment or to another overall stack without this influencing the connection of the second or inner passages in a U configuration or a Z configuration. It is easy to block off the individual cell stacks or overall stacks with respect to one another by means of suitable intermediate plates. In this case, it is possible for transfer passages to be produced in intermediate plates or flat components between the cell stacks, for example by stamping out of a plate, without additional and complex components being required.

The apparatus according to the invention can be modified by simply exchanging and/or regrouping cells, cell stacks or barrier or intermediate plates so as to be adapted to other separation or synthesis processes. By contrast, there is generally no need to redesign components or produce new components. In particular, in the apparatus according to the invention it is possible to deliberately set a pressure loss in the transfer or connecting passages between the first and second passages. Furthermore, it is easy to modify the number of active cells in each individual cell stack.

Furthermore, the invention can be used for any type of layers, processes, process substances and process parameters with different overall shapes and modes of production. The apparatus according to the invention can be used in general terms for technical separation processes as are also employed, for example, in food engineering. It can advantageously be used in particular where large-area and cost-intensive separating layers are employed.

The abovementioned temperature-control passages in at least one cell stack of the apparatus according to the invention may advantageously be arranged between or in the region of first passages for supplying or discharging process substances. In this way, the respective first passages for the various process substances can be arranged at a maximum distance from one another within a cell stack. This leads to improved operational reliability in particular in the case of fuel cells which are operated with hydrogen.

In an overall stack according to the invention, it is possible, in particular by preliminary distribution of the process substances, to select advantageous flow configurations for the cells irrespective of an installation position of the individual cell stacks or an external connection of the overall stack. Furthermore, the overall stacks or cell stacks according to the invention can be successfully combined with other systems, since the preferred overall stack according to the invention has predefined interfaces at its ends.

The tie rods mentioned can advantageously be routed through the first and/or second passages; the consumption of surface area for the second passages can be reduced still further in particular if the tie rods are arranged in the first passages.

An exemplary embodiment of an apparatus according to the invention for separation or synthesis of process substances (in this case a PEM fuel cell) is explained in more detail below by way of example with reference to the appended diagrammatic drawings, in which:

DETAILED DESCRIPTION

FIGS. 1 to 5 illustrate a stack assembly or an overall stack 10 of an apparatus for separation or synthesis of process substances. The overall stack 10 is formed from a plurality of cell stacks 12, 12' and 12", between which there are arranged plates 14, 16 and 18, the structure and function of which will be explained in detail below.

Figure 1:
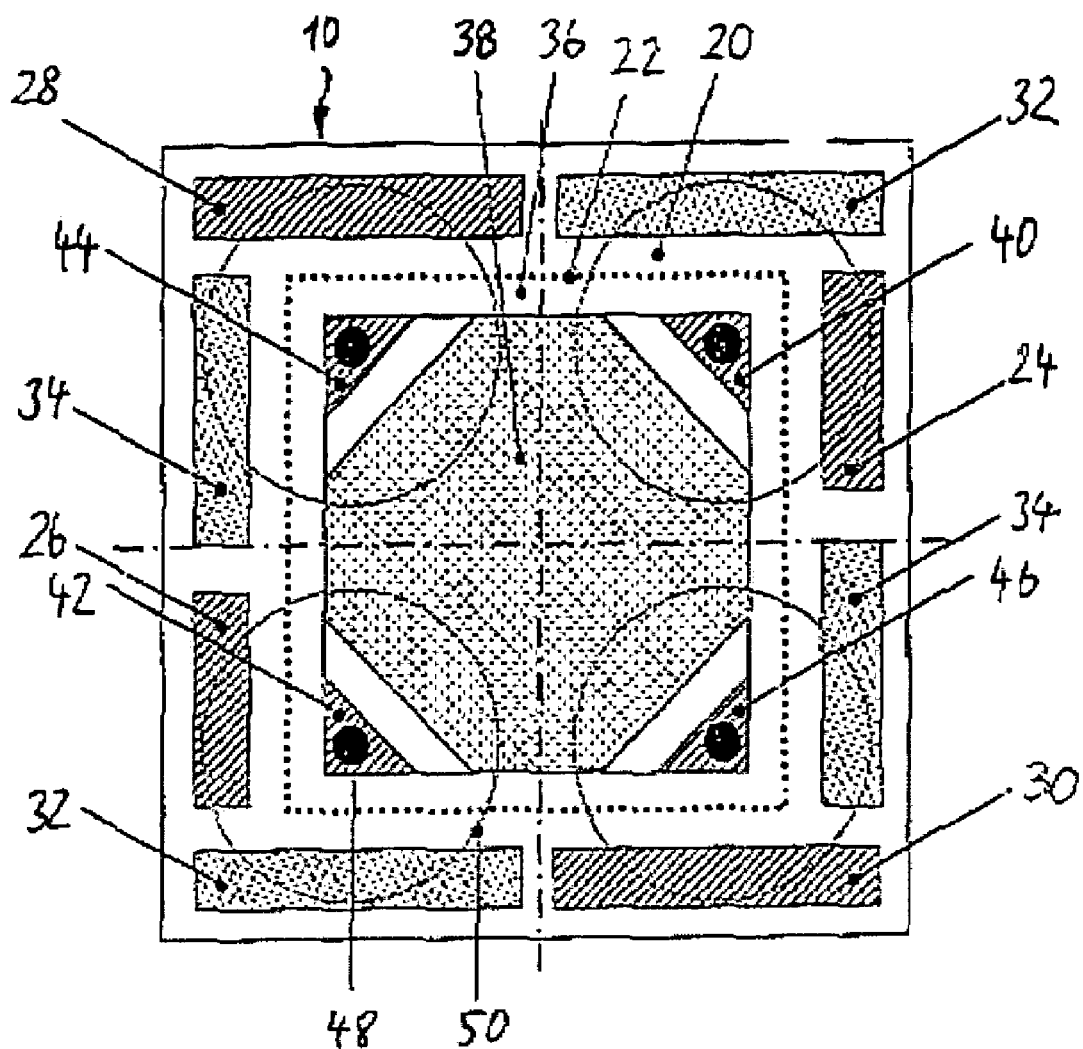
FIG. 1 shows a cross section through a cell stack of an exemplary embodiment of an apparatus according to the invention.

FIG. 1 illustrates a simplified cross section through an overall stack 10 of this type. In the region of the cell stacks 12, 12' and 12", the overall stack 10 is configured with a frame 20 which has a square external contour. Large-area layers 22 for separation or synthesis of process substances in the form of individual, selectively permeable membranes are held in the frame 20.

In the frame, a first passage or outer passage 24 for supplying hydrogen as first process substance, a first passage or outer passage 28 for supplying air as second process substance, a first passage or outer passage 26 for discharging hydrogen, a first passage or outer passage 30 for discharging air, two passages 32 for supplying cooling water and two passages 34 for discharging cooling water are formed outside the layers 22.

The passages 24 to 34 in each case extend perpendicular to the plane of the drawing shown in FIG. 1 through the frame 20 of a respective cell stack 12, 12' and 12". They are each configured with a rectangular and relatively large cross-sectional area, so that the individual passage 24 to 34 has a low flow resistance to the supply and discharge of the two process substances hydrogen and air and also of the cooling water. The passages 24 and 26 for supplying and discharging hydrogen, and the passages 28 and 30 for supplying and discharging air, are in each case arranged diagonally opposite one another in the frame 20 in the case of the arrangement selected. The passages 32 and 34 for the cooling water are in each case arranged between these passages 24 to 30, resulting in uniform cooling and improved process reliability of the overall arrangement.

All the passages 24 to 34 are arranged at the outer edge of the frame 20. In an edge region 36 inside the frame 20, the layers 22 are laid on the frame 20, so that an active surface 38 of the respective layer 22 remains within the frame 20. Furthermore, this active surface 38 of the layers 22 is reduced in size only by four so-called second passages or inner passages 40, 42, 44 and 46, of which the second passages or inner passages 40 and 42 are used to feed and discharge hydrogen to and from the layers 22 and the second passages or inner passages 44 and 46 are used to feed and discharge air to and from the layers 22.

The passages 40 and 42 for supplying and discharging hydrogen and the passages 44 and 46 for supplying and discharging air are in each case arranged diagonally opposite one another, resulting in a relatively long flow path for the process substances hydrogen and air or oxygen across the respective layer 22.

The passages 40 to 46 are designed with relatively small, triangular cross sections in the corners of the frame 20. Furthermore, tie rods 48, which interact with disc springs 50 and are used to clamp the overall stack 10, extend in each case through the passages 40 to 46.

Figure 2:
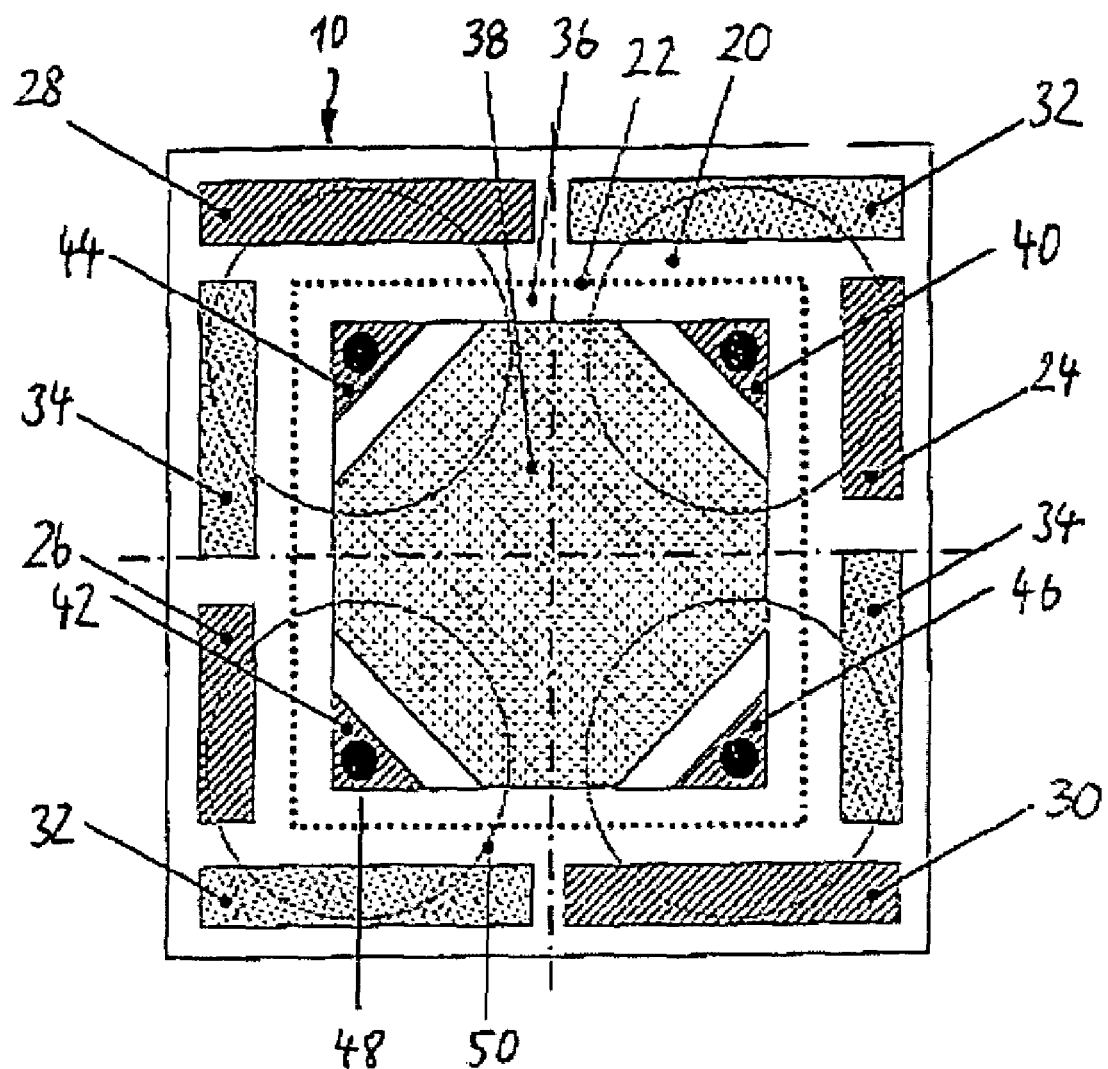
FIG. 2 shows a longitudinal section through the apparatus shown in FIG. 1.

FIG. 2 illustrates how in particular the process substance air is fed to and discharged from the layers 22 in the overall stack 10. The air which is to be supplied is firstly passed through the first passage 20, bypassing a first cell stack 12, to a second cell stack 12' and a third cell stack 12". In the region of a temperature-control or cooling plate 16 and a transfer plate 18, the air passes from the first passage 28 through a transfer passage 52 into the second passage 44, through which the air is passed to the respective layers 22 of the second cell stack 12' or of the third cell stack 12".

The air which is supplied is transferred along the layers 22 to the second passages 46, from where it passes into transfer passages 54 and then into the first passages 30. The air which is to be discharged is collected in the passages 30 and then carried out of the overall stack 10.

To achieve the flow described above, there is furthermore in each case a barrier or separating plate 14 arranged next to the cooling plate 16 between the cell stacks 12, 12' and 12". In a blocking region 56, the blocking plate 14 prevents air from the second passages 44 or 46 from passing from the first cell stack 12 into the second cell stack 12' or from the second cell stack 12' into the third cell stack 12".

Figure 3:
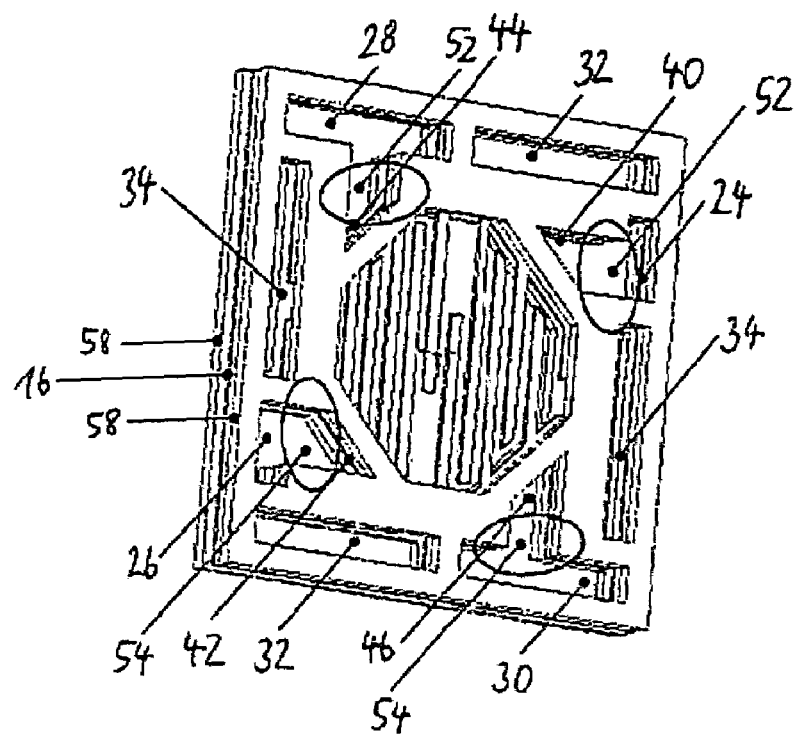
FIG. 3 shows a perspective view of a transfer plate with seals of the apparatus shown in FIG. 1.

Seals, as illustrated by reference numeral 58 in FIG. 3 in particular, are arranged between the individual plates 14 to 18 and the cell stacks 12, 12' and 12". Furthermore, FIG. 3 also illustrates a temperature-control or cooling plate 16, in which transfer passages 52 and 54 are likewise formed. The transfer passages 52 and 54 allow a targeted supply of the process substances to the layers 22.

Figure 4:
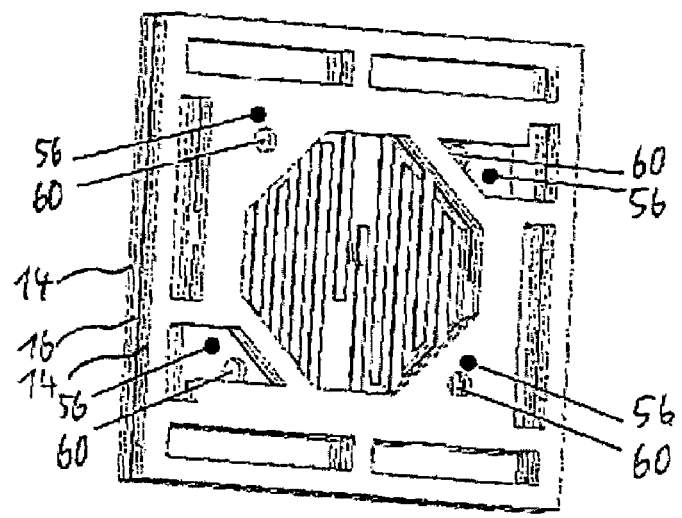
FIG. 4 shows a perspective view of a temperature-control or cooling plate with barrier or separation plates of the apparatus shown in FIG. 1.

FIG. 4 illustrates a temperature-control or cooling plate 16 with separating or barrier plates 14, which are simultaneously configured as seals, arranged next to it. FIG. 4 illustrates how the barrier plates 14 prevent process substances from flowing over from the second passages 40 to 46 of a first cell stack 12 to a second cell stack 12' in a blocking region 56. In the respective blocking region 56, there is only an opening 60 for one of the tie rods 48 to pass through. If tie rods 48 are not used in the overall stack 10, the openings 60 are dispensed with altogether.

Figure 5:
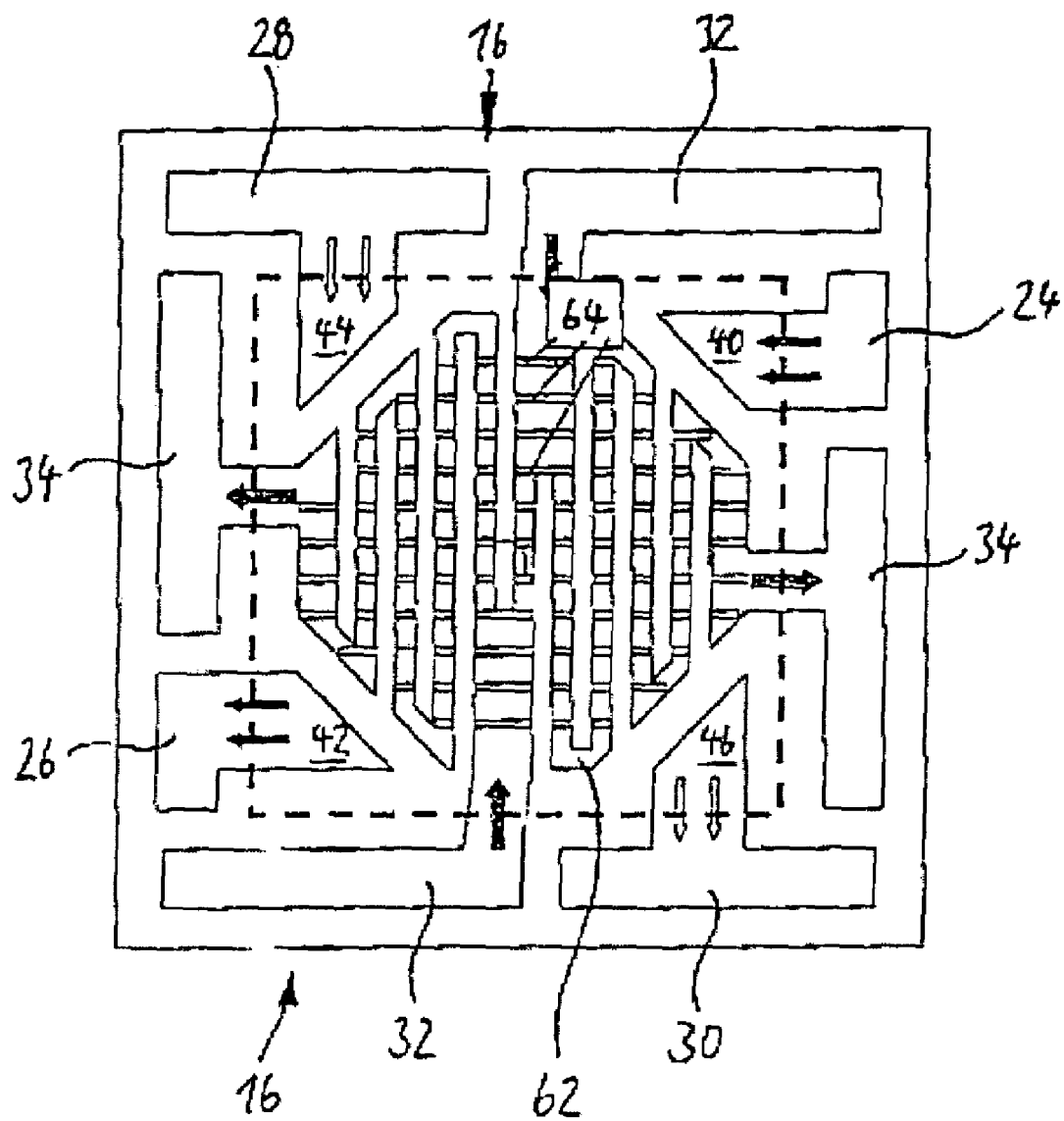
FIG. 5 shows a plan view of a temperature-control plate of the apparatus shown in FIG. 1.

Finally, FIG. 5 shows a temperature-control plate 16 and a cooling-water passage 62 formed therein. The cooling water is fed to the temperature-control plate 16 through the passages 32 at two opposite regions. The cooling water is then passed through the cooling-water passage 62 which is distributed in meandering form over the active surface 38. Auxiliary passages 64, which are used to further branch the cooling water and distribute it over the surface 38, are formed at the cooling-water passage 62.

A number of embodiments have been described. Nevertheless, it will be understood that various modifications may be made. For example, elements of different embodiments, including apparatuses and processes, may be combined, supplemented, or removed to produce other embodiments. Additionally, elements of the various embodiments may use a variety of technologies and components. Accordingly, other embodiments are within the scope of the following claims.

LIST OF REFERENCE SYMBOLS

10 Stack assembly or overall stack
12 Cell stack
14 Barrier or separating plate
16 Temperature-control or cooling plate
18 Transfer plate
20 Frame
22 Layer
24 First passage (outer passage) for supplying hydrogen
26 First passage (outer passage) for discharging hydrogen
28 First passage (outer passage) for supplying air
30 First passage (outer passage) for discharging air
32 Passages for supplying cooling water
34 Passages for discharging cooling water
36 Inner region of the frame
38 Active surface
40 Second passage (inner passage) for supplying hydrogen
42 Second passage (inner passage) for discharging hydrogen
44 Second passage (inner passage) for supplying air
46 Second passage (inner passage) for discharging air
48 Tie rod
50 Disc spring
52 Transfer passage
54 Transfer passage
56 Blocking region
58 Seal
60 opening for tie rod
62 Cooling-water passage
64 Auxiliary passage

What is claimed is:

1. An apparatus for separation or synthesis of process substances, the apparatus comprising:
   at least two cell stacks, within each of which there is arranged at least one large-area layer for separation or synthesis, and
   at least two passages for a process substance being formed within at least a first cell stack,
   of which at least a first passage for said process substance is arranged outside the at least one large-area layer and is used to pass said process substance through the first cell stack to a second cell stack, and
   of which at least a second passage for said process substance passes though the at least one large-area layer and is used to feed or discharge said process substance to or from the at least one large-area layer in the first cell stack.

2. The apparatus as claimed in claim 1, in which the first passage has a larger cross section than the second passage.

3. The apparatus as claimed in claim 1, in which, at least at the first cell stack, at least one transfer passage is formed for connecting the first passage to the second passage.

4. The apparatus as claimed in claim 3, in which a mechanism for adjusting a flow through the transfer passage is provided in the transfer passage.

5. The apparatus as claimed in claim 3, in which the transfer passage is formed in a transfer plate between the first cell stack and the second cell stack.

6. The apparatus as claimed in claim 5, in which the transfer plate is simultaneously designed as a cooling plate.

7. The apparatus as claimed in claim 5, in which the transfer plate is simultaneously designed as a seal.

8. The apparatus as claimed in claim 1, in which at least one tie rod is arranged in one or more of the first passage and the second passage.

9. The apparatus as claimed in claim 1, in which an overall stack is formed, in which at least two cell stacks, separated by a barrier plate which has the first passage passing through it, are combined.

10. The apparatus as claimed in claim 9, in which the barrier plate is simultaneously designed as a temperature-control plate.

11. The apparatus as claimed in claim 9, in which the barrier plate is simultaneously designed as a seal.

12. The apparatus as claimed in claim 1, in which a cell stack has passing through it at least one temperature-control passage, which is arranged outside the at least one layer.

13. A PEM fuel cell having the apparatus for separation or synthesis of process substances as claimed in claim 1.

* * * * *

UNITED STATES PATENT AND TRADEMARK OFFICE
CERTIFICATE OF CORRECTION

PATENT NO. : 7,393,389 B2  Page 1 of 1
APPLICATION NO. : 11/009542
DATED : July 1, 2008
INVENTOR(S) : Harald Maus It is certified that error appears in the above-identified patent and that said Letters Patent is hereby corrected as shown below:

Title Page; item (54);
Cover page, the title, delete "SEPERATION" and insert --SEPARATION--.

Column 1, line 1, the title, delete "SEPERATION" and insert --SEPARATION--.

Column 8, line 6, delete "though" and insert --through--.

Signed and Sealed this

First Day of September, 2009

David J. Kappos
*Director of the United States Patent and Trademark Office*